(12) United States Patent
Castillo et al.

(10) Patent No.: US 10,447,074 B2
(45) Date of Patent: Oct. 15, 2019

(54) BEHAVIOR MODIFICATION OF A POWER SUPPLY IN RESPONSE TO A DETECTED CONDITION

(71) Applicant: HEWLETT PACKARD ENTERPRISE DEVELOPMENT LP, Houston, TX (US)

(72) Inventors: Samantha Jean Castillo, Houston, TX (US); David Paul Mohr, Spring, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 143 days.

(21) Appl. No.: 15/119,122

(22) PCT Filed: Feb. 27, 2014

(86) PCT No.: PCT/US2014/019007
§ 371 (c)(1),
(2) Date: Aug. 15, 2016

(87) PCT Pub. No.: WO2015/130288
PCT Pub. Date: Sep. 3, 2015

(65) Prior Publication Data
US 2017/0063149 A1    Mar. 2, 2017

(51) Int. Cl.
*H02J 9/06* (2006.01)
*H02J 3/46* (2006.01)

(52) U.S. Cl.
CPC ............... *H02J 9/061* (2013.01); *H02J 3/46* (2013.01); *H02J 2009/068* (2013.01)

(58) Field of Classification Search
CPC ......... H02J 9/061; H02J 3/46; H02J 2009/068
See application file for complete search history.

(56) References Cited

U.S. PATENT DOCUMENTS

| 7,245,185 B2 | 7/2007 | Litovsky et al. |
| 8,179,698 B2 | 5/2012 | Jang et al. |
| 8,384,243 B2* | 2/2013 | Adest ............... H01L 31/02021 307/43 |
| 9,178,359 B2* | 11/2015 | Subramaniam ........... H02J 5/00 |

(Continued)

FOREIGN PATENT DOCUMENTS

| CN | 102468685 | 5/2012 |
| TW | 201010251 | 3/2010 |

(Continued)

OTHER PUBLICATIONS

Baabjerg, F., Power Converters and Control of Renewable Energy Systems, Nov. 24, 2008, 20 pps., http://www.andretahim.com/Projecto/Literatura/power%20converters%20and%20control%20of%20renewable%20energy%20systems%20paper.pdf.

(Continued)

*Primary Examiner* — Jared Fureman
*Assistant Examiner* — Michael J Warmflash
(74) *Attorney, Agent, or Firm* — Hewlett Packard Enterprise Patent Department

(57) ABSTRACT

Examples herein disclose a first power supply comprising a controller to detect a condition associated with a device. The First power supply includes a converter to modify behavior of the first power supply in response to the detected condition associated with the device.

20 Claims, 6 Drawing Sheets

(56) References Cited

U.S. PATENT DOCUMENTS

| | | | |
|---|---|---|---|
| 9,318,918 B2* | 4/2016 | Zhang | H02J 1/102 |
| 2002/0125869 A1 | 9/2002 | Groom | |
| 2003/0090916 A1* | 5/2003 | Thrap | H02J 1/102 |
| | | | 363/67 |
| 2006/0132086 A1* | 6/2006 | Altenburg | H02J 9/061 |
| | | | 320/106 |
| 2006/0226706 A1* | 10/2006 | Edelen | H02J 9/06 |
| | | | 307/64 |
| 2009/0009001 A1* | 1/2009 | Marwali | H02J 9/061 |
| | | | 307/65 |
| 2012/0139241 A1* | 6/2012 | Haj-Maharsi | F03D 7/0224 |
| | | | 290/44 |
| 2012/0169311 A1 | 7/2012 | Malmberg et al. | |
| 2012/0200161 A1* | 8/2012 | Isler, III | H02J 9/06 |
| | | | 307/65 |
| 2012/0268106 A1 | 10/2012 | Blake et al. | |
| 2013/0073104 A1 | 3/2013 | Sciacchitano | |
| 2013/0307340 A1 | 11/2013 | Subramanium et al. | |
| 2014/0049108 A1* | 2/2014 | Hsu | H02J 3/06 |
| | | | 307/52 |
| 2014/0049117 A1* | 2/2014 | Rahman | H02J 4/00 |
| | | | 307/82 |
| 2015/0069858 A1* | 3/2015 | Frampton | H02J 3/44 |
| | | | 307/127 |
| 2015/0121113 A1* | 4/2015 | Ramamurthy | H02J 9/061 |
| | | | 713/340 |
| 2016/0013652 A1* | 1/2016 | Li | H02J 3/32 |
| | | | 307/24 |
| 2016/0204606 A1* | 7/2016 | Matan | H02J 3/38 |
| | | | 700/291 |

FOREIGN PATENT DOCUMENTS

| | | |
|---|---|---|
| TW | 201401029 | 1/2014 |
| TW | 201407919 | 2/2014 |

OTHER PUBLICATIONS

PCT/ISA/KR, International Search Report dated Nov. 18, 2014, PCT/US2014/019007, 10 pps.

* cited by examiner

BEHAVIOR MODIFICATION OF A POWER SUPPLY IN RESPONSE TO A DETECTED CONDITION

BACKGROUND

A power system is a network of electrical components to supply, transmit, and use electrical power. In the power system, a controller coordinates the electrical components to supply the electrical power to a load. The controller transmits commands to each of the electrical components to monitor and respond to various conditions within the power system.

BRIEF DESCRIPTION OF THE DRAWINGS

In the accompanying drawings, like numerals refer to like components or blocks. The following detailed description references the drawings, wherein.

DETAILED DESCRIPTION

Figure 1:
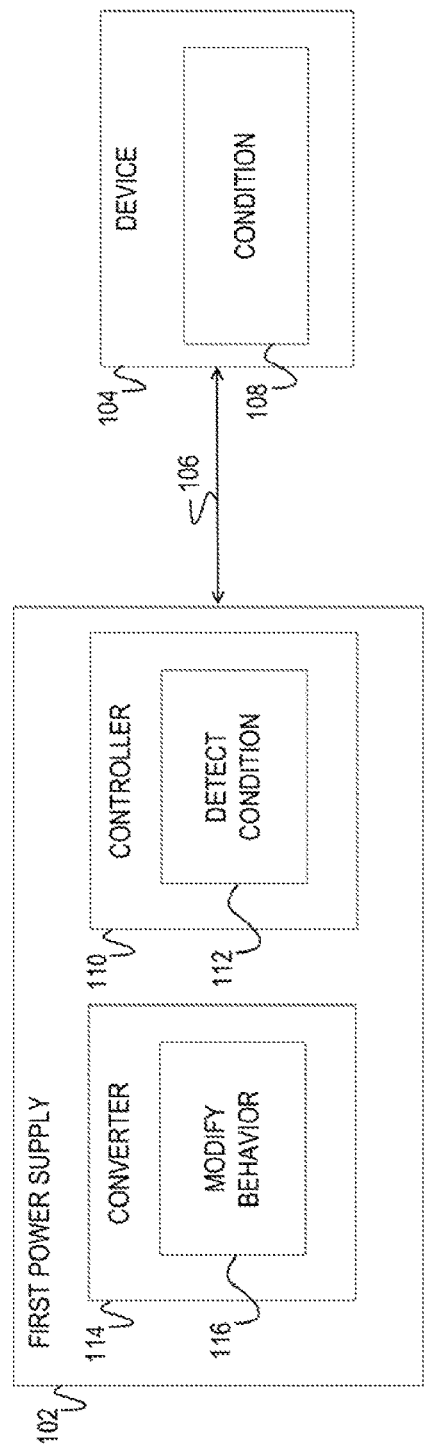
FIG. 1 is a block diagram of an example first power supply including a controller to monitor a bus for detection of a condition in a device and in turn a converter modifies behavior of the first power supply in response to the detected condition.

A power system communication structure may include master slave communication architecture. In the master slave communication architecture, a power system controller operates as a master while each of the system components including the power supplies operate as slaves. This master slave communication architecture results in time delays in response times as the system components depend on the power system controller to receive communications regarding a condition of other network components. Depending on the system controller to receive commands and status updates to direct the network components to respond results in additional time delays. Further, if the power supplies are not properly controlled and monitored, the power system may waste power. This results in an overall less efficient power system.

To address these issues, examples disclosed provide a more efficient communication structure in monitoring conditions in a power system. The examples disclose a first power supply including a controller to detect a condition associated with a device. The condition includes an existing state or event occurrence associated with the device which may affect the performance of the device and in turn the power system. For example, if the device is close to approaching a thermal event, this may indicate the device is approaching its operational temperature limit prior to potential failure. In response to the detected condition a converter modifies behavior of the first power supply. The modification of behavior of the first power supply may include adjusting output to a load of the power system. Enabling the first power to respond proactively to the detected condition provides power supply independence thus providing a more efficient power system. Additionally, modifying the behavior of the first power supply without dependence on the power system controller removes the master slave communication architecture reducing response time for the first power supply to respond to the detected condition. This promotes a more reliable and efficient power system.

In a further example discussed herein, the condition may include at least one of a thermal condition, physical position condition, and/or efficiency condition. Depending on a type of the condition, the first power supply may modify its behavior differently. In this implementation, the first power supply may include a decision to determine the type of modification of behavior. Depending on the type of condition, the first power supply may increase and/or decrease its output to the load of the power system accordingly. For example, using this, if the first power supply detects a fault at the device, the first power supply may increase its output to the load. In another example, the power system may draw different power loads at different locations, thus if the draw of power is greater within close proximity to the first power supply and the device, the first power supply may turn on or off to prevent over-heating in particular locations. This provides an additional element of intelligence enabling the first power supply to operate independently from the power system controller.

Yet, in another example, the first power supply and the device are located at different addresses on the communication bus. In this example, the device may include a second power supply. Thus, the first power supply detects the conditions by identifying a source of the communications and responding accordingly. This further reduces the amount of time for the first power supply to respond to the detected condition as the first power supply identifies the source of the detected condition rather than waiting for the power system controller to identify the detected condition.

In summary, examples disclosed herein provide a direct communication structure between a power supply and power system components. This approach provides an independent power supply and enables a more efficient and proactive approach for a power supply to respond to various conditions within a power system.

Referring now to the figures, FIG. 1 is a block diagram of an example first power supply 102 including a controller 110 and a converter 114. The controller 110 monitors a bus 106 for communications from a device 104 for detection of a condition 108 at module 112. The converter 114 responds to the detected condition at module 112 by modifying behavior of the first power supply 102 at module 116. In this manner, the first power supply 102 may monitor, interpret, and proactively respond through behavior modification at module 116 without dependence on a command from a power system controller. Additionally, this implementation promotes power supply independence and increases power performance by enabling the first power supply 102 to respond proactively to the detected condition of the device 104 through behavior modification at module 116.

The first power supply 102 and the device 104 represent a power system for delivery of power to a load. As such, implementations of the power system include a server, power circuit, embedded system, power supply system, computing system, distributed power system, or other type of circuit system capable of providing power to the load. Although FIG. 1 illustrates the first power supply 102 and the device 104, this was done for illustrations purposes and not for limiting implementations. For example, FIG. 1 may include multiple power supplies, a common input rail to each of the power supplies, and/or common output rail.

The device 104 is component within the power system which transmits signals to the first power supply 102. The first power supply 102 analyzes the signals to detect the condition of the device 104 at module 112. For example, the first power supply 102 may detect the condition 108 within close proximity to the device 104 indicating an increased thermal temperature. In this example, the first power supply 102 may decrease its output to the load to decrease the thermal temperature and signal to the device 104. In this example, the controller 110 may flag the converter 114 that an internal temperature sensor is in an over-temperature protection (OTP) condition. The first power supply 102 would transmit a help request out to the device 104, which may include a system fan. The help request would request additional cooling at which point, the device 104 would increase a fan speed to aid cooling the first power supply 102. Additionally, the device 104, may be a parallel second power supply that allows the first power supply 102 to transfer part of the load to the parallel second power supply. In this example, the first power supply 102 decreases the load contribution, while the second power supply increases the load contribution. This prevents the power system from throttling and/or the first power supply 120 from throttling off due to the over-temperature protection condition.

The condition 108 is an existing state or event occurrence associated with the device 104 which may affect performance of the device 104. In this manner, the condition 108 is a type of event that occurs at the device 104 which may affect functioning of the power system. The first power supply 102 monitors the bus for the condition 108 at the device 104 so the first power supply may augment the power to the load to prevent interruption of the power system. In an implementation, the condition 108 includes one of a thermal condition, efficiency condition, and/or a physical position condition. In another implementation, depending on a type of the condition 108, the first power supply 102 may modify its behavior differently at module 116. For example, if the first power supply 102 detects a fault condition of the device 104, the first power supply 102 may increase its output to the load. In another example, if the device 104 is under performing according to an efficiency threshold, the first power supply 102 may decrease its output and transmit a signal to the device 104 to increase output to the load. Additionally, although FIG. 1 illustrates the condition 108 as internal to the device 104 this was done for illustration purposes as the condition 108 may be external, but within close proximity to the device 104.

The bus 106 is a transmission medium which carries direct communication between the device 104 and the first power supply 102. In one implementation, the bus 106 is connected between a port at the first power supply 102 and a port at the device 104. The ports serve as an interface between the bus 106 and each of the components 102 and 104. In another implementation, the first power supply 102 and the device 104 are each located at different addresses along the bus 106. In this implementation, the first power supply 102 may identify a source of the communications through identifying the address of the device 104. The bus 106 enables direct communications between the first power supply 102 and the device 104. The direct communications on the bus 106 between the power supply 102 and device 104 removes the master-slave communication architecture between the power system controller and components 102 and 104. This further reduces response time for the first power supply 102 to respond to the condition 108 at the device 104.

The first power supply 102 includes the controller 110 to monitor communications on the bus 106 from the device 104. Based on the detection of the condition at module 112, the controller 110 signals to the converter 114 to modify the behavior of the first power supply 102 at module 116. In this manner, the first power supply 102 monitors, interprets, and responds through behavior modification without dependence on a command from the power system. This removes the master-slave structure where the power system controller (not illustrated) is the master while the power supply 102 responds based on receiving commands from the master. The first power supply 102 includes a power supply, power feed, power source, generator, power circuit, energy storage, power system, or other type of voltage source capable of providing the load (not illustrated) to the power system. Further, although FIG. 1 illustrates components 110 and 114 this was done for illustration purposes and not for limitation purposes. For example, the first power supply 102 may include an output that is adjusted to increase or decrease power to the load.

The controller 110 monitors the bus 106 for communications from the device 104 to detect the condition at module 112. The controller 110 is considered a different controller than the power system controller (not illustrated). This enables the first power supply 102 for direct communications with other devices in the power system to proactively respond to events in the power system which may cause an interruption and/or failure. Additionally in providing the direct communications, the controller 110 may respond to the event in the power system in a timely manner. Implementations of the controller include a processor, circuit logic, a microchip, chipset, electronic circuit, microprocessor, semiconductor, microcontroller, central processing unit (CPU), or other device capable monitoring the bus 106 for the detected condition as module 112.

At module 112, the controller 110 detects the condition associated with the device 104. The controller 110 may receive communications from the device 104 for analysis to determine whether a condition has occurred or is about to occur at the device. In one implementation, the device 104 transmits a status and/or the condition 108 on the bus 106 to the first power supply 102. This enables the first power supply 102 to detect the condition 108 at module 112 and respond accordingly. The module 112 may include an instruction, set of instructions, process, operation, logic, technique, function, firmware, and/or software executable by the first power supply 102 to detect the condition at the device 104 from communications received on the bus 106.

The converter 114 is an electrical device which receives an input power and converts the power to an output (not illustrated) to provide to the load. In one implementation, the modification of behavior of the first power supply 102 at module 116 includes the converter 114 increasing or decreasing the output to provide to the load. In another implementation, the modification of behavior at module 116 includes the converter 114 turning on or off. Implementations of the converter 114 include a voltage converter, power converter, electronic converter, direct current (DC) to DC converter, alternating current (AC) to DC converter, or other type of converter capable of receiving the input power for conversion to the output power.

At module 116, the controller 110 may signal to the converter 114 to modify the behavior of the first power supply 102. In one implementation, the controller 110 signals to the converter 114 to adjust the output of the first power supply 102. In this implementation, the converter 114 may increase or decrease its output in response to the detected condition at the device 104. The module 116 may include an instruction, set of instructions, process, operation, logic, technique, function, firmware, and/or software executable by the first power supply 102 to modify behavior of the first power supply 102 through the converter 114.

Figure 2:
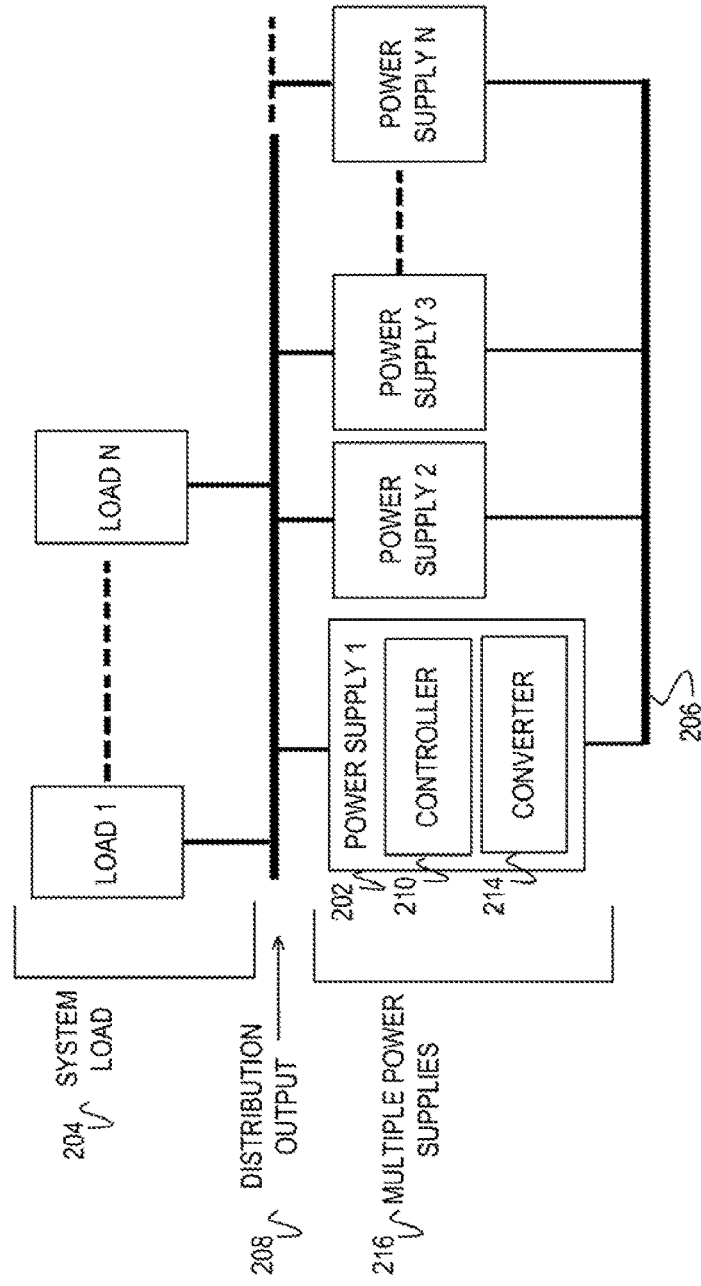
FIG. 2 is a block diagram of an example power system including a system load and multiple power supplies for communication along a bus.

FIG. 2 is a block diagram of an example power system including a system load 204 to receive power from multiple power supplies 216 over a distribution output 208. The multiple power supplies 216 (POWER SUPPLY 1, POWER SUPPLY 2, POWER SUPPLY 3, POWER SUPPLY N) communicate with each other over a bus 206. FIG. 2 illustrates the multiple power supplies 216 communication among the bus 2060 to deliver output to the system load 204. The first power supply 202 (POWER SUPPLY 1) includes a controller 210 to detect a condition among the various other power supplies (POWER SUPPLY 2, POWER SUPPLY 3, and POWER SUPPLY N). Based upon the detection of the condition among one of the various power supplies, the first power supply 202 includes a converter 214 to modify its behavior accordingly. Additionally, FIG. 2 represents the direct communication structure between each of the multiple power supplies 216 to produce a more efficient power system. The first power supply 202, the controller 210, the converter 214, and the bus 206 may be similar in functionality and structure to the first power supply 102, the controller 110, the converter 114, and the bus 106 as in FIG. 1. Additionally, although FIG. 2 illustrates the first power supply 202 as including components 210 and 214, implementations should not be limited as this was done for illustrations purposes. For example, the other power supplies (POWER SUPPLY 2, POWER SUPPLY 3, and POWER SUPPLY N) may each include their own controller and converter. Each power supply controller detects among each of the multiple power supplies 216 from the bus 206 and in turn, the converter modifies the behavior of the respective power supply.

Figure 3:
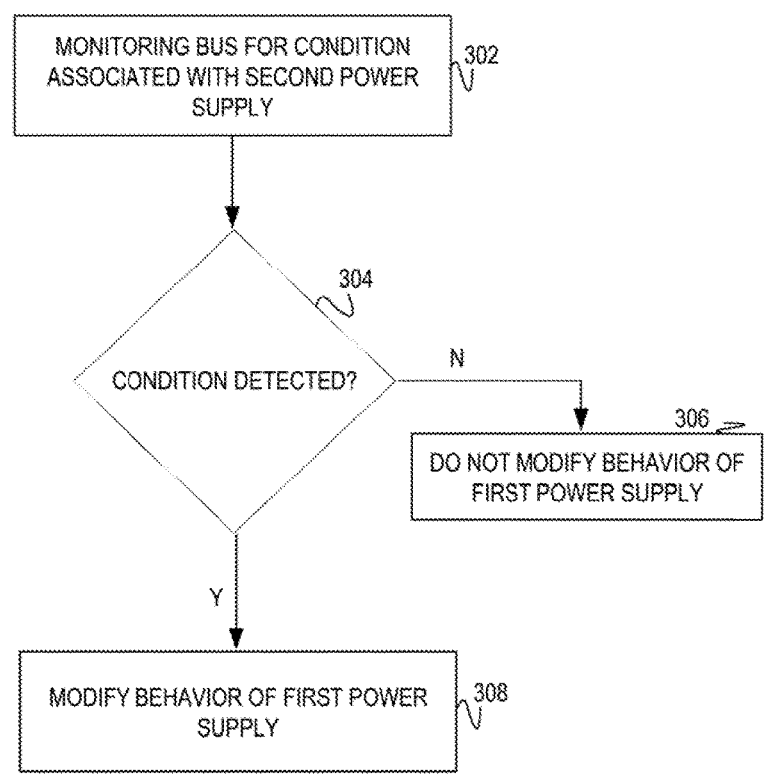
FIG. 3 is a flowchart of an example method executable by a first power supply to detect a condition within a second power supply and modify the behavior of the first power supply, accordingly.

FIG. 3 is a method executable by a first power supply to detect a condition at a second power supply and modifying behavior of the first power supply based upon the detected condition. The first power supply monitors a bus for communications from the second power supply. Monitoring the bus, the first power supply may detect the condition at the second power supply. The condition is an existing state or event occurrence of the second power supply that may affect an output of the second power supply to a load. Monitoring the communication bus, the first power supply may identify states within the second power supply such as over-temperature, over-load, exceeding power ratings, etc. Based on detecting the condition within the second power supply, the first power supply may proceed to modify its behavior for accommodating the detected condition of the second power supply. For example, the second power supply may be approaching its full capability, thus the first power supply may detect this condition of the second power supply approaching its power limits. Upon detecting this condition, the first power supply may increase output power to the load to prevent the second power supply from exceeding its rating. Enabling direct communication among the power supplies enables the first power supply to know conditions of other power supplies and modify the behavior of the first power supply based on the conditions from the other power supplies. This further enables an independent power supply as removing a master slave concept between a power system controller and each power supply. In discussing FIG. 3, references may be made to the components in FIGS. 1-2 to provide contextual examples. For example, a controller 110 associated with a first power supply 102 as in FIG. 1 executes operations 302-308 to monitor a condition within a second power supply and respond, accordingly. Additionally, although FIG. 3 is described as implemented by the first power supply 102 and/or controller 110 as in FIG. 1, it may be executed on other suitable components. For example, FIG. 3 may be implemented in the form of executable instructions on a machine-readable storage medium 604 as in FIG. 6.

At operation 302, the first power supply monitors the communication bus for the condition associated with the second power supply. Each power supply includes a different address location on the bus. As such upon receiving communications, the receiving power supply may identify the location of each power supply along the bus, thus enabling the receiving power supply to determine which power supply may be encountering a condition which may affect power to the load. In one implementation, the second power supply may transmit a status and/or the condition to multiple power supplies, including the first power supply. In another implementation, the first power supply may include a sensing circuit to monitor various conditions from other power supplies on the bus. In one implementation the condition may include one of a physical position of the second power supply, a thermal condition of the second power supply, and/or an efficiency condition of the second power supply. Monitoring the communication bus enables the first power supply to receive communications from the second power supply and determining how the first power supply should be performing rather than waiting for a command from the system controller. In another implementation, the first power supply may monitor the bus for communications from multiple power supplies within a system. Analyzing communications from the bus within the power system enables the first power supply to identify the condition, such as over-temperature, over-load, exceeding power supply ratings, etc. within one of the multiple power supplies. The power supplies may communicate status to one another, thus enabling a collective response among the multiple power supplies to the detected condition within one of the multiple power supplies instead of individual action by one of the multiple power supplies that may result in cascade failure.

At operation 304, the first power supply detects the condition within the second power supply. Upon detecting the condition, the first power supply may proceed to operation 308 to modify the behavior of the tint power supply, accordingly. Upon not detecting the condition within the second power supply, the first power supply may proceed to monitor communications from power supplies as at operation 302. In another implementation, upon not detecting the condition within the second power supply, the first power supply may proceed to operation 306 and does not modify behavior.

At operation 306, upon not detecting the condition at operation 304, the controller within the first power supply may not modify its behavior. In one implementation upon no detected condition, the controller within the first power supply continues to monitor the communication bus as at operation 302.

At operation 308, the controller associated with the first power supplies modifies the behavior of the first power supply in response to the detected condition at the second power supply. In one implementation behavior modification, the controller may adjust the output of the first power supply by increasing or decreasing the output to the load. In this implementation, the controller may signal to a converter within the first power supply to increase or decrease the output. In another implementation of operation 308, the controller may determine a load associated with a power system for determining how much power the first power supply should contribute to the load. In this implementation, the controller determines a number of power supplies within the power system and the load associated with the power system. Additionally, the controller may determine the amount of power in which the first supply should contribute to the load and adjust an output of the first power supply accordingly. For example, to maintain output to a system load upon detecting an over-temperature condition within the second power supply, multiple power supplies may increase their output to accommodate the over-temperature condition of the second power supply. In another implementation, a converter within the first power supply may adjust the output of the first power supply. In this implementation, the first power supply may increase or decrease its output to accommodate the detected condition of the second power supply. In a further implementation, the first power supply communicates the status of the first power supply to other power supplies. This enables direct communication among the multiple power supplies rather than indirect communication through the system controller and to each power supply. For example, the first power supply may communicate its status either before the implementation of the behavior modification or upon implementation of the behavior modification. The third power supply receives the status and may modify its behavior based upon the communications from the first power supply. Yet, in a further implementation, the type of condition detected at operation 304 determines a type of behavior modification of the first power supply. These implementations are explained in detail in later figures.

Figure 4:
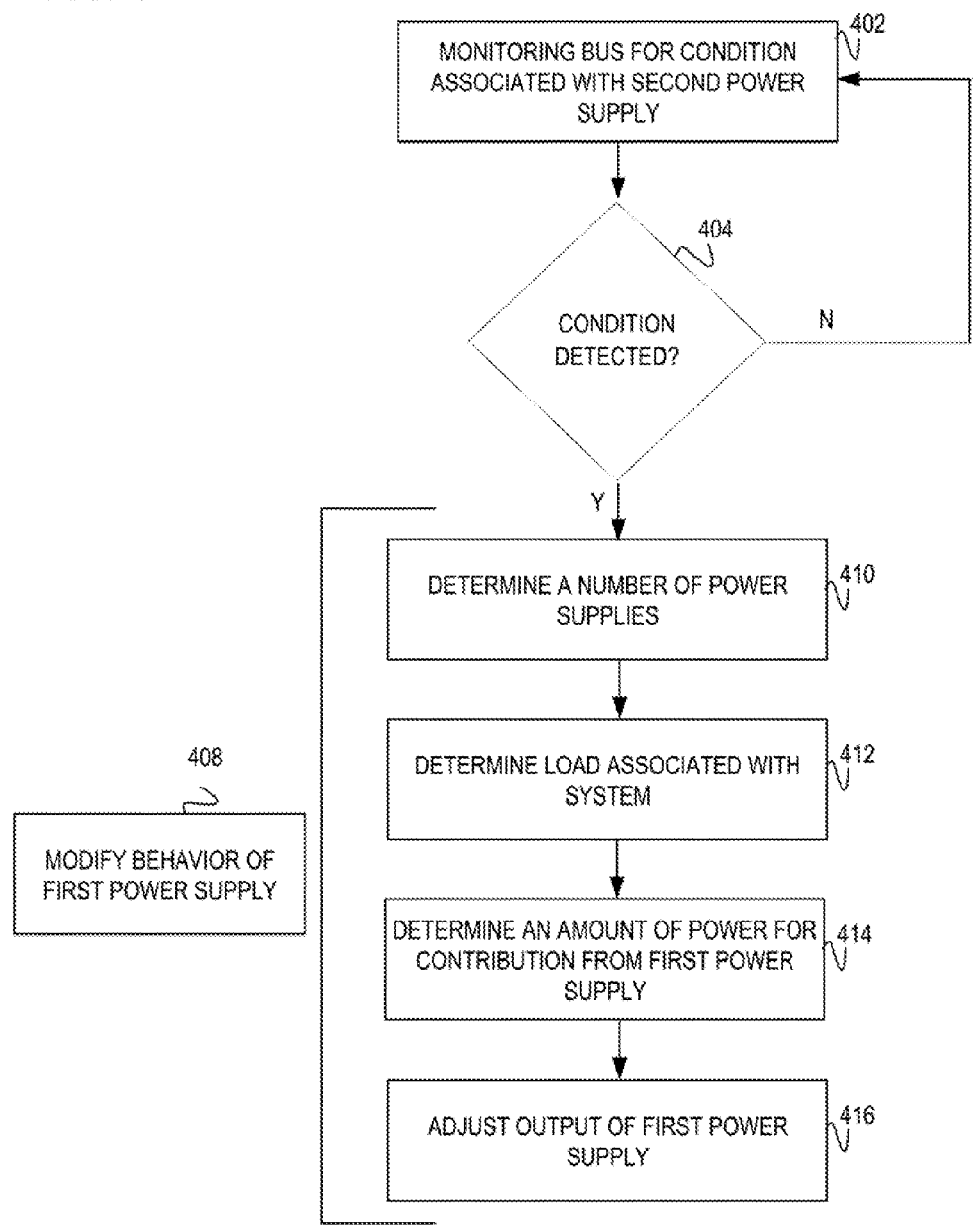
FIG. 4 is a flowchart of an example method executable by a first power supply to detect a condition within a second power supply and modify its behavior by determining a number of power supplies and a load within a power system for the first power supply to contribute an amount of power to the load.

FIG. 4 is a flowchart of an example method executable by a first power supply to monitor a bus for communications from a second power supply. The communications may signal to the first power supply a condition at the second power supply. The communications enable the first power supply to detect the condition at the second power supply. Based upon the detected condition, the first power supply may modify behavior through determining a number of power supplies within a power system. The first power supply determines a load associated with the power system for determining an amount of power in which the first power supply should contribute to the load in response to the detected condition at the second power supply. The first power supply may adjust its output for contribution to the load. Determining the number of power supplies in the power system and the amount of power in which the first power supply should contribute enables an efficient load sharing. This increases power utilization and minimizes power waste as the first power supply may augment power to the load depending on the detected Condition at the second power supply. Each of the power supplies are considered part of the power system and as such may include power supplies in addition to the first and the second power supplies to supply power to the load. In discussing FIG. 4, references may be made to the components in FIGS. 1-2 to provide contextual examples. For example, a controller 110 associated with a first power supply 102 as in FIG. 1 executes operations 402-416 to monitor a condition within a second power supply and respond, accordingly. Additionally, although FIG. 3 is described as implemented by the first power supply 102 and/or controller 110 as in FIG. 1, it may be executed on other suitable components. For example, FIG. 4 may be implemented in the form of executable instructions on a machine-readable storage medium 604 as in FIG. 6.

At operation 402, the first power supply monitors the bus for the condition associated with the second power supply. In this operation, the power supplies may communicate between each other using the bus. Each of the power supplies are located at a different address on the bus, so including the address in the communications enables a receiving power supply to identify a source of the communications. In one implementation, the communication includes a status and/or condition of the respective power supply. Communicating the status and address enables the first power supply to identify the source of that status for detecting the condition at operation 404. Operation 402 may be similar in functionality to operation 302 as in FIG. 3.

At operation 404, the first power supply detects the condition at the second power supply. In one implementation, the condition may include at least one of a thermal condition, physical position condition, and/or efficiency condition. Depending on a type of the condition, the first power supply may modify its behavior differently. These implementations are described in detail in the next figure. Operation 404 may be similar in functionality to operation 304 as in FIG. 3.

At operation 408, the controller associated with the first power supply modifies the behavior of the first power supply in response to the detected condition at operation 404. In one implementation, the modification of behavior may include adjusting an output of the first power supply, such as increasing or decreasing the output to the load. In another implementation, the modification of behavior may include operations 410-416 to adjust the output of the first power supply. Operation 408 may be similar in functionality to operation 308 as in FIG. 3.

At operation 410, the controller associated with the first power supply determines a number of powers supplies within the power system. At this operation each of the number of power supplies includes a different address location on the bus. The controller receives the communications from each of the number of power supplies and may determine the overall number of power supplies in the power system. In another implementation, the controller may track a number of operational power supplies contributing to the load. In this implementation, based on determining the number of operational power supplies contributing the load, enables the first power supply to determine how to modify its behavior to cover the detected condition at the second power supply.

At operation 412, the controller determines the load to provide to the system. In one implementation, the controller receives communications from each of the number of power supplies that may include the amount of power each power is contributing to the load. Thus, the controller may determine the load to continue providing to the system. In another implementation, a controller as part of the power system tracks power pulled by the load and communicates the amount of power pulled by the load to the first power supply. Determining the amount of power pulled by the load enables the controller to determine the amount of power for the first power supply to contribute to the load in response to the detected condition at the second power supply. This enables the first power supply to cover a deficiency in the load caused by the detected condition at the second power supply.

At operation 414, the controller determines the amount of power for the first power supply to provide the load. Upon determining the number of power supplies within the power system and the load to deliver the load at operations 410-412, enables the controller to determine the amount of power for the first power supply to provide the load given the detected condition of the second power supply. For example, if the detected condition indicates the second power supply may suffer an interruption, the first power supply may increase its output contribution to the load to ensure the power system remains online.

At operation 416, the controller adjusts the output of the first power supply. In this implementation, the first power supply may include a power converter which converts an input power to the output for delivery to the load. The controller may signal to the converter to increase and/or decrease the output to the load in response to the detected condition at operation 404. In another implementation, adjusting the first power supply may include turning a converter within the first power supply on or off.

Figure 5:
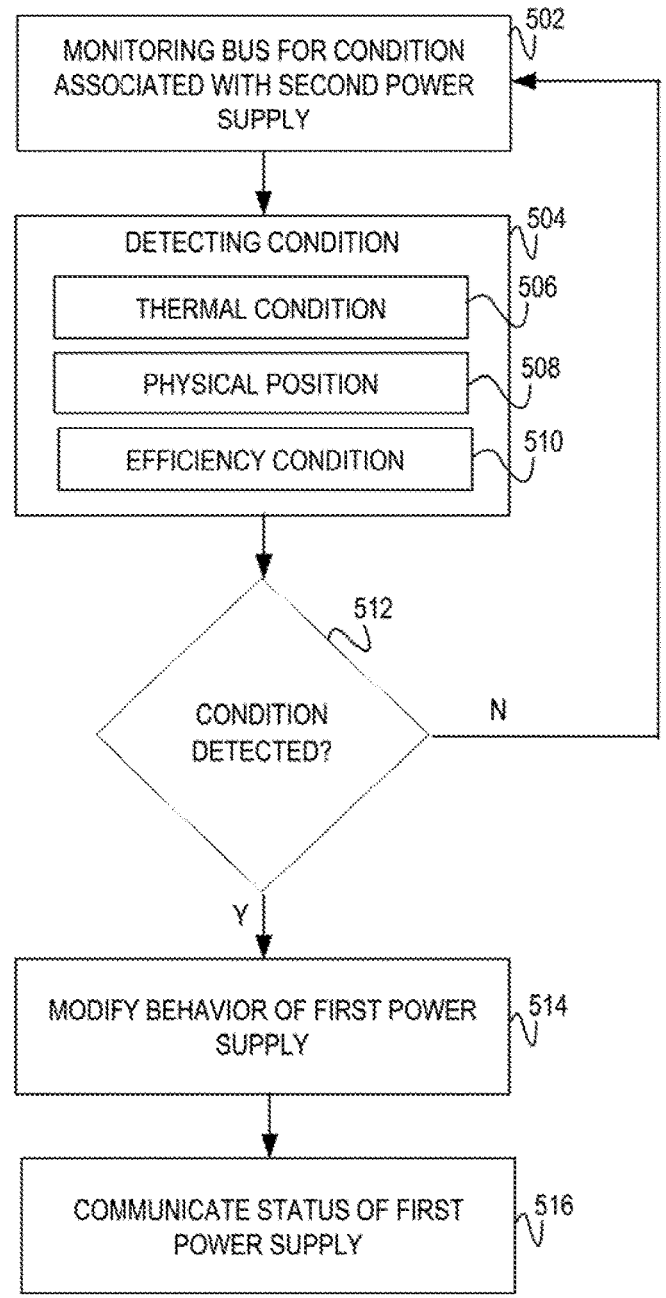
FIG. 5 is a flowchart of an example method to executable by a first power supply to detect a condition including physical position, efficiency, and/or thermal condition of a second power supply, the first power supply modifies its behavior based on the condition and communicates a status to other power supplies.

FIG. 5 is a flowchart of an example method executable by a first power supply to monitor a bus for detecting a condition at a second power supply. The detected condition may include a physical position condition, efficiency condition, and/or thermal condition of the second power supply. In response to one of these detected conditions, the first power supply modifies its behavior and communicates a status of the first power supply to other power supplies in a power system. In one implementation a type of the detected condition (e.g., efficiency, thermal, etc.) determines a type of modification of behavior of the first power supply. In this implementation, the first power supply may include a decision to determine the type of modification of behavior. Depending on the type of condition, the first power supply may increase and/or decrease its output to the load of the power system accordingly. For example, using the decision, if the first power supply detects a fault condition of the second power supply, the first power supply may increase its output to the load. In discussing FIG. 5, references may be made to the components in FIGS. 1-2 to provide contextual examples. For example, a controller 110 associated with a first power supply 102 as in FIG. 1 executes operations 502-516 to monitor a condition within a second power supply and respond, accordingly. Additionally, although FIG. 5 is described as implemented by the first power supply 102 and/or controller 110 as in FIG. 1, it may be executed on other suitable components. For example, FIG. 5 may be implemented in the form of executable instructions on a machine-readable storage medium 604 as in FIG. 6.

At operation 502, the first power supply monitors the bus for a condition encountered at the second power supply. At operation 502, the first power supply receives communications indicating status and/or condition of multiple power supplies including the second power supply. Receiving communications from the bus enables the first power supply direct communications among the multiple power supplies to proactively respond to conditions at each of the multiple power supplies without delay. Operation 502 may be similar in functionality to operations 302 and 402 as in FIGS. 3-4.

At operation 504, the first power supply monitors the communications received on the bus for analysis. Analyzing the communications from the second power supply, the first power supply may detect the condition encountered at the second power supply. In one implementation, the detected condition may include one of the thermal condition, physical position condition, and/or efficiency condition as at operations 506-508. Each of these conditions are considered a different type of condition. Each of these conditions and the corresponding behavior modification is explained in detail at each of the following operations. Operation 504 may be similar in functionality to operations 304 and 404 as in FIGS. 3-4.

At operation 506, the type of condition detected at the second power supply by the first power supply may include the thermal condition. The thermal condition at the second power supply is a temperature state associated with the second power supply. The thermal state may include an over-temperature or approaching a temperature threshold. As such, the thermal state may affect the output of the second power supply and in turn this affects an overall load of the power system. For example, the second power supply may be experiencing an over temperature limit, thus the first power supply may modify its behavior to standby in the event the second power supply may suffer a failure.

At operation 508, the first power supply may determine the type of condition includes the physical position condition at the second power supply. As explained earlier, each power supply is located a different address position on the bus. Thus, the power supplies may communicate their position and conditions among each other. The physical position or a failure may be in close proximity to the second power supply, thus this may indicate for the first power supply to increase its output to the load to prevent system interruption. In another example, the power system may draw different power loads at different locations. In this example, the thermal condition of reaching the temperature threshold may be located in close proximity to the second power supply and as such, the first power supply may turn on or off to prevent over-heating in particular locations.

At operation 510, the first power supply may detect the condition at the second power supply as the efficiency condition. The efficiency condition of the second power supply may include a power optimization threshold. As such, if the second power supply does not reach the power threshold, this may indicate the efficiency condition. For example, in the event the first power supply recognizes the second power supply is approaching an operational limit, the first power supply may increase its output to prevent an over current protection from occurring at the second power supply. In another example, in the event the second power supply encounters a fault, the first power supply may detect this fault condition through the bus and increase output contribution to the load to prevent the power system from dropping out.

At operation 512, the first power supply may detect the condition at one of operations 506-510. Operation 512 may operate as a redundant process to detect the condition prior to modifying the first power supply at operation 514. Including operation 512 as redundant to operation 504 ensures the condition may affect output of the second power supply prior to modifying the behavior of the first power supply to prevent power waste. Operation 512 may be similar in functionality to operations 304 and 404 as in FIGS. 3-4.

At operation 514, the first power supply modifies its behavior in response to the detected condition as at operations 504-512. In one implementation the behavior modification of the first power supply depends on the type of detected condition. For example, the first power supply may increase its output to primarily supply the load, while in another example, the first power supply may turn off. Operation 514 may be similar in functionality to operations 308 and 408 as in FIGS. 3-4.

At operation 516, the first power supply communicates the status to multiple power supplies in the power system. Each of the multiple power supplies may receive communications on the bus, thus the status of the first power supply may affect the load of the power system. Thus, each of the multiple power supplies may modify each of their respective behavior to fully support the load of the power system. The status of the first power supply may depend on implementation of the modification of behavior. For example, in one implementation, the first power supply may transmit the status prior to implementation of behavior modification. In another implementation, the first power supply may transmit the status upon implementation of the behavior modification.

Figure 6:
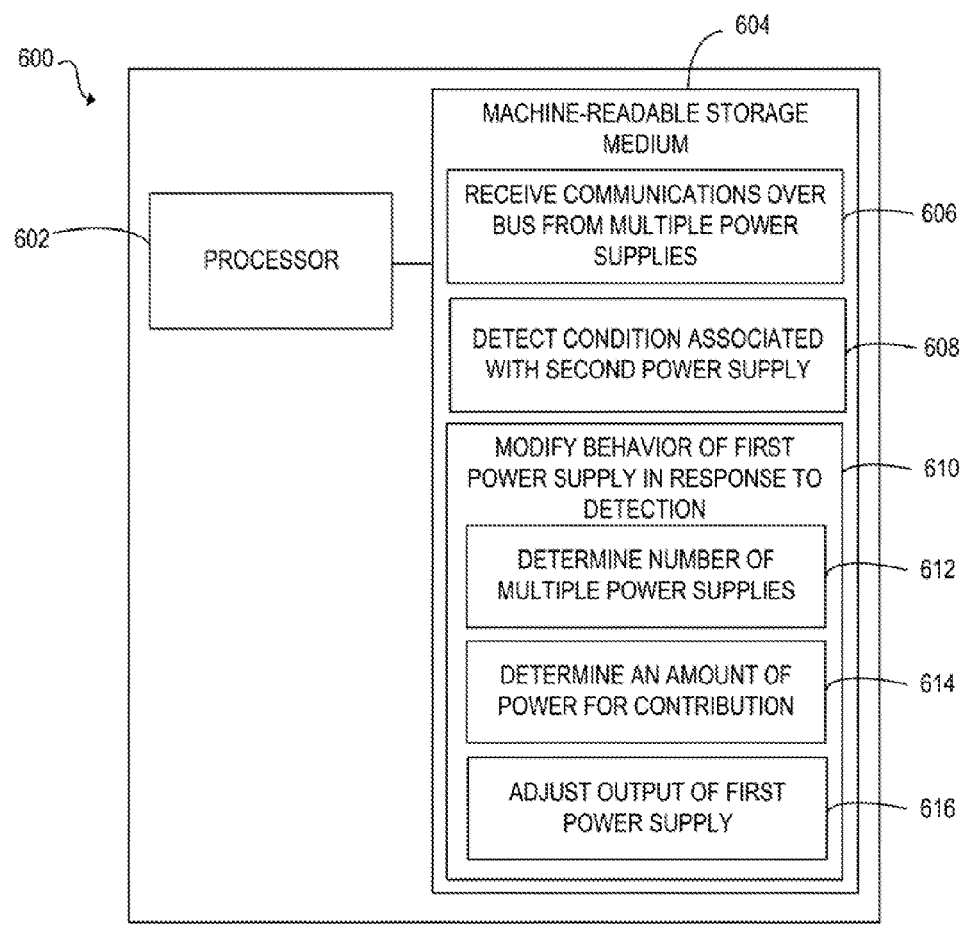
FIG. 6 is a block diagram of an example computing device with a processor to execute instructions in a machine-readable storage medium for receiving communications over a bus for detecting a condition within one of multiple power supplies and adjusting behavior of one of the power supplies, accordingly.

FIG. 6 is a block diagram of an example computing device 600 with a processor 602 to execute instructions 606-616 in a machine-readable storage medium 604. Specifically, the computing device 600 with the processor 602 is to receive communications over a bus from multiple power supplies and detect a condition within one of the power supplies. The computing device 600 with the processor 602 may modify behavior of its corresponding power supply based on the detected condition within one of the power supplies. Although the computing device 600 includes processor 602 and machine-readable storage medium 604, it may also include other components that would be suitable to one skilled in the art. For example, the computing device 600 may include the first power supply 102 and/or controller 110 as in FIG. 1. The computing device 600 is an electronic device with the processor 602 capable of executing instructions 606-616, and as such embodiments of the computing device 600 include a computing device, mobile device, client device, personal computer, desktop computer, laptop, tablet, video game console, or other type of electronic device capable of executing instructions 606-616. The instructions 606-616 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-616 to monitor the condition in one of the multiple power supplies and respond to the detected condition in another one of the multiple power supplies. In one implementation, once executing instructions 606-610, the processor 602 may proceed to exit the instructions. In another implementation, once executing instructions 606-610, the processor 602 may proceed to execute instructions 612-616 to determine a number of multiple power supplies and adjust an output to contribute to a load in response to the number of multiple power supplies and the detected condition in one of the multiple power supplies. Specifically, the processor 602 executes instructions 606-610 to: receive communications from multiple power supplies across a communication bus; detect the condition associated within one of the multiple power supplies (e.g., a second power supply) in which communications are received; and to modify behavior of one of the other multiple power supplies (e.g., a first power supply) in response to the detected condition. The processor 602 may proceed to instructions 612-616 to: determine the number of multiple power supplies within a power system; determine a load within the power system and an amount of contribution in which the first power supply should contribute to the load; and adjust the output of the first power supply in response to the detected condition, the output is determinative on the amount of contribution to the load. In this manner, the processor 602 associated with the first power supply may proactively respond to the detected condition in the second power supply. Responding proactively adjusting the first power supply, the power system may prevent delays as the power supplies may directly communicate with one another.

The machine-readable storage medium 604 includes instructions 606-616 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memoly (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

In summary, examples disclosed herein provide a direct communication structure between power supplies. The examples provide a more efficient and proactive approach for a power supply to respond to various conditions associated with other power supplies within a power system.

We claim:

1. A power system comprising:
a first power supply comprising:
a converter to output power to a load; and
a controller to:
detect, from a communication bus a communication sent by one of multiple power supplies connected to the communication bus at different bus addresses and that are delivering power to the load, where the communication indicates a condition experienced by a particular power supply among the multiple power supplies;
in response to the detected condition, determine which behavior modification to implement at the converter, such that the determined behavior modification is dependent on the detected condition; and
wherein the converter is to implement the determined behavior modification of the first power supply.

2. The power system of claim 1 wherein the behavior modification of the first power supply includes the converter to increase an output of the first power supply.

3. The power system of claim 1 wherein the converter implements the determined behavior modification of the first power supply without a system communication.

4. The power system of claim 1, further comprising:
the multiple power supplies; and
the communication bus.

5. The power system of claim 4 wherein to detect, from the communication, the condition associated with the other power supply, the controller is configured to:
monitor the communication bus for detection of the condition associated with the other power supply.

6. The power system of claim 4 further comprising:
a port to provide communications between the first power supply and the other power supply over the communication bus.

7. The power system of claim 1,
wherein the detected condition is an over-temperature condition in the other power supply and
wherein the controller is to, responsive to the detected condition being the over-temperature condition, determine the behavior modification to include increasing power to the load while the other power supply decreases power to the load.

8. The power system of claim 1 wherein the condition experienced by the other power supply includes one of the following: a thermal condition; an efficiency condition; and a physical position condition.

9. The power system of claim 1 wherein the behavior modification implemented by the converter includes one of the following: increasing the power delivered by the first power supply; decreasing the power delivered by the other power supply; decreasing the power delivered by the first power supply; and increasing the power delivered by the other power supply.

10. The power system of claim 1 wherein each of the multiple power supplies detects conditions in the other power supplies located adjacent to each other.

11. The power system of claim 1 wherein the first power supply is further configured to:
receive the communication on the communication bus that includes the address of the other power supply from the multiple power supplies.

12. A method, executable by a first power supply, the method comprising:
delivering power to a load;
monitoring a communication bus for a communication, from one of multiple power supplies delivering power to the load, that indicates a condition experienced by an other power supply among the multiple power supplies, each of the power supplies being connected to the communication bus at different bus addresses;
detecting the condition associated with the other power supply based on the communication that includes an address of the other power supply; and
in response to the detected condition, implementing by a converter in the first power supply a behavior modification at the first power supply.

13. The method of claim 12 wherein in response to the detected condition, implementing by the converter in the first power supply the behavior modification comprises:
determining a number of power supplies, out of the multiple power supplies, that will deliver power to the load;
determining a power requirement associated with the load; and
determining an amount of power for contribution to the load from the first power supply based on the determined number of power supplies and the determined power requirement.

14. The method of claim 12 wherein a type of the detected condition determines a type of modification of behavior of the first power supply.

15. The method of claim 12 comprising:
communicating a status of the first power supply to a third power supply, the third power supply modifies behavior of the third power supply.

16. The method of claim 12 wherein detecting the condition associated with the other power supply based on the communication that includes the address of the other supply includes detecting one of the following over the communication bus from the communication: a thermal condition of the other power supply; a physical position of the other power supply; and an efficiency condition of the other power supply.

17. A non-transitory machine-readable storage medium comprising instructions that when executed by a processor of a first power supply cause the processor to:
monitor a communications bus to which multiple power supplies, including the first power supply, are connected, where the power supplies are to deliver power to a load;
detect, based on one or more communications that are received on the communications bus from one or more of the power supplies, a condition associated with an other power supply among the multiple power supplies that deliver power to a load; and
modify behavior in the first power supply in response to detecting the condition associated with the other power supply.

18. The non-transitory machine-readable storage medium of claim 17 comprising instructions that when executed by the processor cause the processor to:
transmit a status of the first power supply to the others of the multiple power supplies via the communications bus; and
wherein the one or more communications received on the communications bus indicate statuses of the one or more of the multiple power supplies.

19. The non-transitory machine-readable storage medium of claim 17 comprising instructions that when executed by the processor cause the processor to:
modify behavior of the first power supply in response to the detected condition associated with the other power supply by:
determining a number of the multiple power supplies that will deliver power to the load based on the one or more communications;
determining an amount of power for contribution to the load from the first power supply based on the determined number of power supplies that will deliver power; and
adjusting an output of the first power supply based on the determined amount of power for contribution to the load by the first power supply.

20. The non-transitory machine-readable storage medium of claim 17, wherein modification of the behavior in the first power supply occurs without receiving a system communication from a system that includes or controls the load.

* * * * *